CONTROLLED INK-JET COPY-REPRODUCING APPARATUS

Original Filed Oct. 22, 1965 4 Sheets-Sheet 1

CONTROLLED INK-JET COPY-REPRODUCING APPARATUS

Original Filed Oct. 22, 1965 4 Sheets-Sheet 2

CONTROLLED INK-JET COPY-REPRODUCING APPARATUS

Original Filed Oct. 22, 1965 4 Sheets-Sheet 3

United States Patent Office

Re. 27,555
Reissued Jan. 16, 1973

27,555
CONTROLLED INK-JET COPY-REPRODUCING APPARATUS

Arthur V. Loughren, 22 Broadlawn Ave., Great Neck, N.Y. 11024

Original No. 3,404,221, dated Oct. 1, 1968, Ser. No. 500,947, Oct. 22, 1965. Application for reissue Sept. 29, 1970, Ser. No. 76,388
Int. Cl. H04n *9/02*
U.S. Cl. 178—5.2 R 21 Claims

Matter enclosed in heavy brackets [ ] appears in the original patent but forms no part of this reissue specification; matter printed in italics indicates the additions made by reissue.

ABSTRACT OF THE DISCLOSURE

A controlled ink-jet apparatus for producing multi-color reproduction of a subject copy comprises a photoelectric scanner for developing video signals representative of the red, green, and blue components of the signal picked up by the scanner. The copy is reproduced on a record sheet disposed on a drum rotated in synchronism with the scanner. For each color component there is provided a set of ink jets disposed on a head which scans the record sheet. Each set comprises a plurality of ink jets or nozzles. The jets from these nozzles pass through individual electric charging cylinders which individually charge the ink droplets emerging from the jets and these droplets then traverse reflecting fields which direct the ink drops either to the record sheet or to the drain. By supplying inks of different optical densities to the several jets of each set and by selectively deflecting ink from predetermined jets to the drain, the optical density of each ink spot on the record can be controlled over a wide range of values to produce effectively a continuous tone color reproduction of the original copy.

This invention relates to controlled ink-jet copy-reproducing apparatus and, while it is of general application, it is particularly adapted for making color reproductions from a colored subject copy, for example, a color transparency or a positive or negative print. It is, however, applicable also to making monochrome reproductions.

Heretofore there have been marketed or proposed various apparatus for making multiple color prints from an original colored subject copy. Among these, the earliest and that in widest use, are multi-color printing presses using color-separation printing plates made by photographic processes. This method is attractive for very large volume printing such as magazines and newspapers, for which it represents a relatively low cost method, but the production of the color-separation printing plates is time-consuming and extremely costly, so that the cost of making a limited number of reproductions is excessive.

A second method of producing multiple color prints has been by regular photographic processes, generally using a laminated film or other photosensitives medium including a plurality of photosensitive dyes which are fixed to transmit light of different chromaticities. This method of making copy prints involves costly and time-consuming developing and printing processes and is subject to the further limitation that there are only a limited number of photosensitive dyes available and those do not ordinarily give the primary colors most desirable, for example saturated red, green, and blue colors, in the resulting prints. An additional and rather severe limitation of the color photographic process is that those dyes which lend themselves to being generated as the end products of the series of reactions initiated by photographic development are not, in general, the dyes which exhibit optimum stability in the presence of light, humidity, etc.

It is an object of the invention, therefore, to provide a new and improved controlled ink-jet copy-reproducing apparatus which obviates one or mode of the above-mentioned limitations and disadvantages of prior apparatus and methods for reproducing multicolor subject copy.

It is another object of the invention to provide a new and improved controlled ink-jet copy-reproducing apparatus which has one or more of the following advantageous characteristics: relative simplicity and low cost; relatively extremely rapid reproduction of a limited number of copies; and virtually unlimited selection of colors for the reproducing medium.

In accordance with the invention, there is provided a controlled ink-jet apparatus for reproducing a subject copy on a record sheet comprising input means for supplying at least one video signal representative of the serial information content of a subject copy to be reproduced and including synchronizing information, a support for a record sheet, a head for scanning a record sheet on the record sheet support in synchronism with the input video signal, ink-jet means controllable over a range of values disposed on the scanning head for depositing ink on a record sheet on its support and including at least one ink-jet for developing a stream of discrete ink droplets, and means responsive to the input video signal for individually controlling the discrete ink droplets to control the optical density of the ink deposit on the record sheet over a range of values, thereby to produce an effectively continuous-tone reproduction of the subject copy. The term "effectively continuous-tone reproduction" is used herein and in the appended claims to refer to a reproduction which has a large number of tonal values between its extreme values, including half-tone reproduction, in contradistinction to two-tone reproduction in which each elemental area is reproduced in one or the other of the extreme tone values.

For a better understanding of the present invention, together with other and further objects thereof, reference is had to the following description, taken in connection with the accompanying drawings, while its scope will be pointed out in the appended claims.

Referring to the drawings:

FIG. 1 as an outline view in elevation showing the general physical layout of the several components of apparatus embodiment in the invention;

FIG. 6 is a schematic circuit diagram of the sampling circuit included in FIG. 5, while

Figure 1:
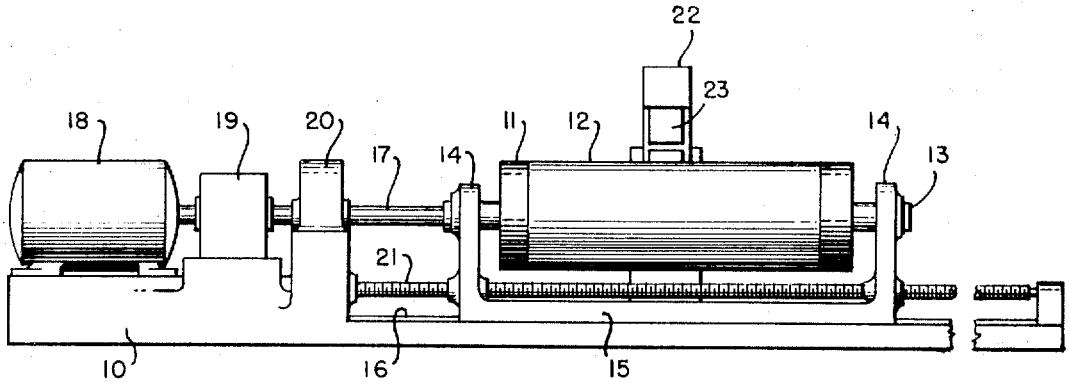
Figure 2:
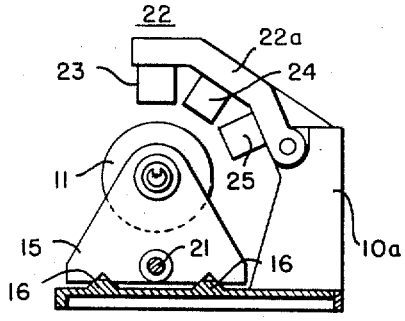
FIG. 2 is an outline end view of the apparatus of FIG. 1.

Referring now more particularly to FIGS. 1 and 2 of the drawings, there is represented a controlled ink-jet apparatus for reproducing a multicolor subject copy on a record sheet comprising a base or frame 10, on which is mounted a rotatable support such as a drum 11 for a record sheet 12, which may be of paper or other suitable material. The drum 11 is mounted on a shaft 13 journalled in upstanding arms 14, 14 of a carriage 15 slidable on a pair of ways 16 similar to those widely used in machine tools. The shaft 13 is hollow and is actuated by a drive shaft 17 which extends into the hollow shaft 13 for a considerable distance and is splined thereto to permit riving of the shaft 13 while the carriage 15 travels along ıe ways 16.

The drive shaft 17 is driven by a motor 18, preferably synchronous motor, which also drives a delay assembly 9, described hereinafter, and a gear train 20. The gear rain 20 drives a lead screw 21, the gear ratio being such ıat, in one revolution of the shaft 17 and the drum 11, ıe lead screw 21 will advance the carriage 15 by exactly ıe line-to-line displacement of the image reproduced on ıe record sheet 12.

The motor 18 is supplied from a suitable power supply ircuit, described hereinafter, of a frequency which produces an acceptable resolution along the length of a canning line on the record sheet 12. Associated with the rum 11 is a stationary head assembly 22 for scanning the ecord sheet 12 on the drum 11 in synchronism with a ideo signal or signals, as described hereinafter. This canning head 22 includes a frame member 22a which arries a plurality of ink-jet heads 23, 24, and 25, described hereinafter, one for each color component, and is ivotally supported on a bracket 10a upstanding from the ame 10 so that the ink-jet heads individually deposit inks f different colors on the record sheet 12.

Figure 3:
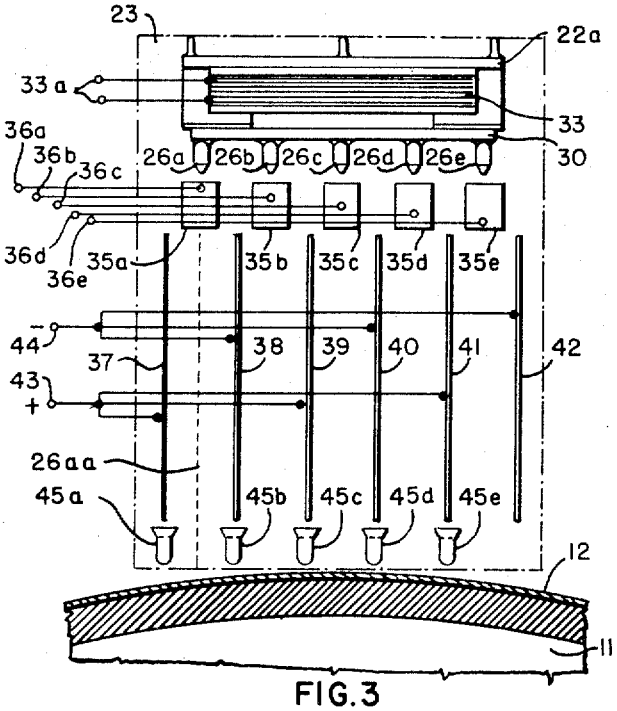
FIG. 3 is a detailed side elevation of one of the ink-jet heads of the apparatus of FIGS. 1 and 2.
Figure 4:
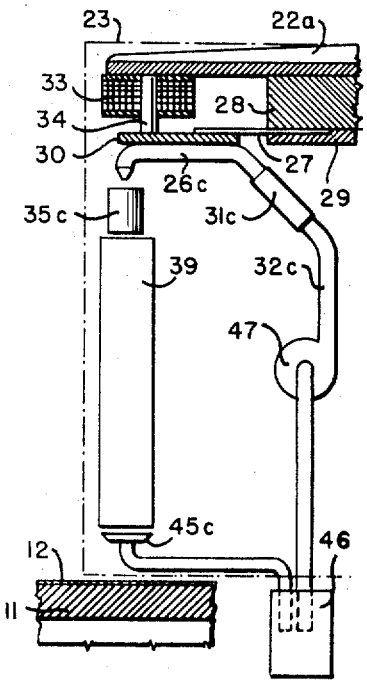
FIG. 4 is a detailed view of a single ink-jet of the type embodied in the apparatus of FIG. 3.

One of the ink-jet heads, for example the head 23, shown in detail in FIGS. 3 and 4. This head comprises ve ink jets or nozzles 26a–26e, inclusive, the tips of hich are directed to the record sheet 12 on the drum 11. he frame 22a carries a flexible hinge member 27 spaced ıerefrom by a spacer 28 and secured by a clamping plate 9. The flexible hinge 27 is secured to a supporting plate r strip 30 on which the five ink jets or nozzles 26a–26e, ıclusive, are mounted in any suitable fashion. Each of ıe ink jets, such as the ink jet 26c of FIG. 4, is provided ith a flexible section, such as the section 31c, which conects to a rigid ink supply pipe such as the pipe 32c. The ık-jet head assembly comprising the supporting plate 30 ıd the ink jets 26a–26e, inclusive, includes means for scillating the ink jets to break up the ink discharged ıerefrom into discrete droplets. Specifically, the plate 30 oscillated vertically at a high frequency, for examle 10,000 to 100,000 c.p.s., by means of an exciting inding 33 energized from high-frequency supply termiıls 33a and cooperating with magnetostrictive armature ement 34 secured to the supporting plate 30 and to ame 22a.

Individually associated with the ink jets 26a–26e are plurality of means for developing electric fields indidual to and encompassing the trajectories of the ink ts to cause the same to deposit ink on the same spot of ıe record sheet 12 for each bit of signal information supied thereto. This means may be in the form of a pluılity of conductive charging cylinders 35a–35e, inclusive, rough which the jets of ink from the nozzles 26a–26e, clusive, pass. It is important that the cylinders 35a–35e, clusive, enclose their respective ink jets at the points here the stream breaks up into droplets. The cylinders 5a–35e, inclusive, are individually and selectively exted with video signals from input terminals 36a–36e, insive as described hereinafter.

Each of the ink-jet heads 23, 24, 25 also comprises series of vertical deflection plates 37–42, inclusive, dis-ɔsed in parallel and capable of developing deflection ·lds individual to the jets of ink from the nozzles 26a–ie. The plates 37–42, inclusive, are excited in pairs to ·oduce electric deflection fields. For example, alternate ates 37, 39, and 41 are connected to the positive termiıl 43 of undirectional supply circuit terminals 43, 44 hile the other plates 38, 40, and 42 are connected to the ·gative terminal 44.

The arrangement of the ink nozzles 26a–26e, inclusive, e charging cylinders 35a–35e, inclusive, and the deflecɔn plates 37–42, inclusive, is such that normally, that is the absence of video-signal components when no elecıc charge is imparted to the ink droplets as they pass rough the cylinders 35a–35e, inclusive, the ink jets proceed directly to the record sheet 12, as schematically represented by the jet 26aa from the nozzle 26a. However, when an electric charge is impressed upon the ink jet by one of the cylinders 35a–35e, the jet is deflected to one of a series of drains 45a–45e, respectively, which are returned to an ink reservoir 46 by gravity, as shown, or by a pump, if required. As shown, the deflection fields between successive pairs of the plates 37–42 are of opposite polarities; in such an arrangement, the polarities of the charges induced on the ink droplets from the nozzles 26a–26e, inclusive, should also reverse polarity from nozzle to nozzle.

Ink is supplied to each of the nozzles 26a–26e from an individual reservoir by an individual pump, such as reservoir 46 and pump 47, providing a high-velocity jet, for example 20 to 200 inches per second. It will be understood that there is an ink supply annd circulating system for each of the ink-jet nozzles of the heads 23, 24, and 25.

Figure 5:
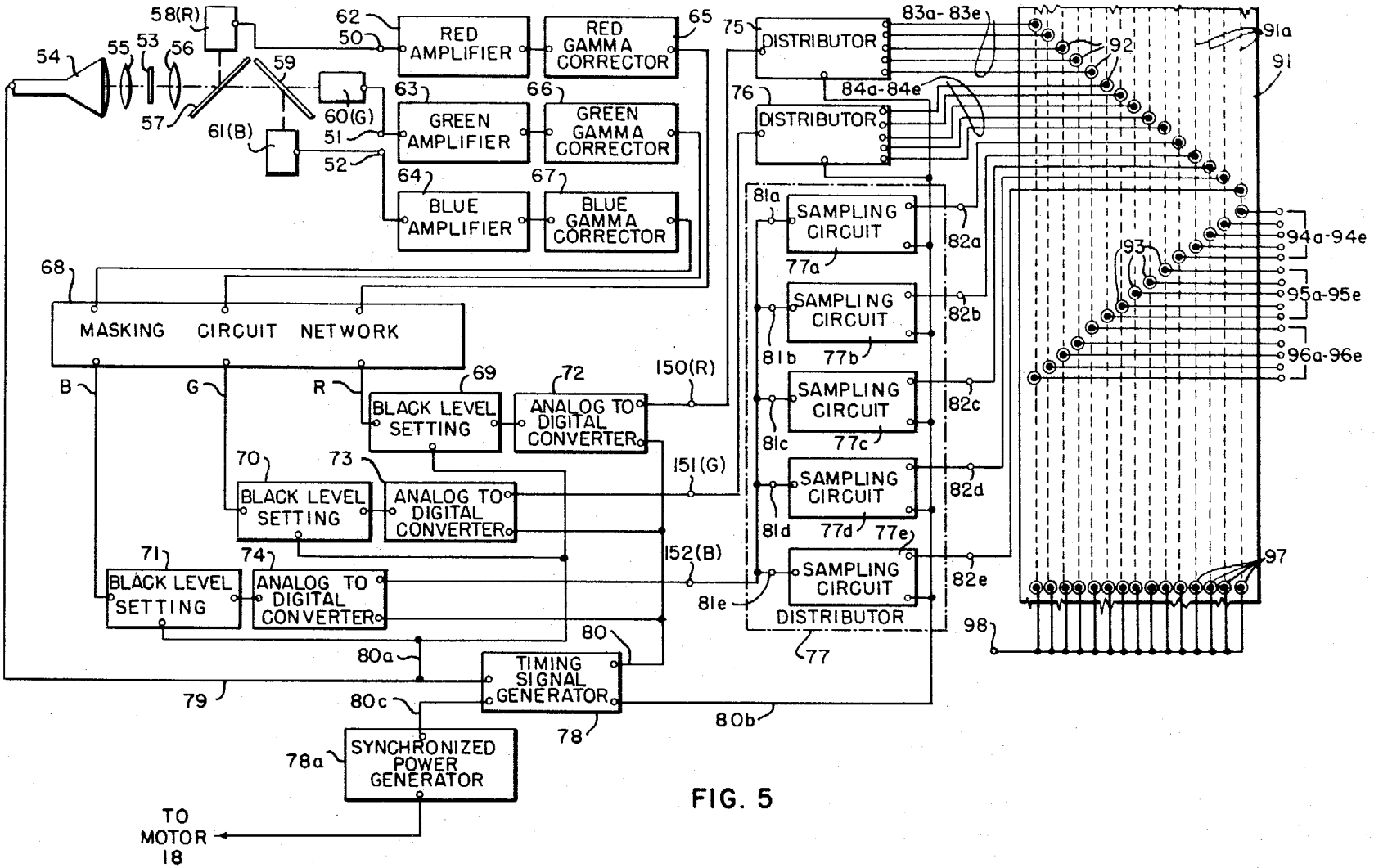
FIG. 5 is a schematic functional diagram of a complete controlled ink-jet copy-reproducing apparatus embodying the invention.

Referring now to FIG. 5 of the drawings, there is shown schematically a complete electrical system for energizing the charging cylinders 35a–35e, inclusive, of the ink-jet heads 23, 24, and 25. This apparatus includes an input circuit for supplying a plurality of video signals each representative of the serial information content of one color component of a subject copy to be reproduced and including synchronizing information. Specifically, the video signals representative of the red, green, and blue color components of the subject copy are supplied at terminals 50, 51, and 52. These color component video signals may be supplied from any suitable source but there is shown, by way of example, an apparatus for deriving these signals from a color slide or transparency 53 and comprising a flying-spot scanner cathode-ray tube 54, an objective lens 55, and a condenser lens 56. The optical system comprising the lenses 55, 56 projects the illuminated spot on the face of the cathode-ray tube 54 onto a dichroic mirror system comprising a red-reflecting dichroic mirror 57, which reflects light onto a red-sensitive photocell 58, and a blue-reflecting dichroic mirror 59, which reflects light onto a blue-sensitive photocell 61, the green component of light passing through the dichroic mirrors 57, 59 to a green-sensitive photocell 60. The photocells 58, 60, and 61 are connected to red, green, and blue signals-translating channels including the amplifiers 62, 63, and 64, respectively, and gamma corrector circuits 65, 66, and 67, respectively, which, in turn, are connected to a masking circuit network shown generally at 68.

The red, green, and blue output connections of the masking circuit network are connected to black level setting circuits 69, 70, and 71, respectively, for stabilizing each of the signal outputs of the networks 68 on the black level of the signal. The elements 54–71, inclusive, form no part of the present invention and may be conventional, for example as shown in the textbook McIlwain and Dean "Principles of Color Television," John Wiley & Sons, 1956, FIGURES 13–3, 13–16, and 13–17.

The black level setting units 69, 70, and 71 are connected to analog-to-digital converters 72, 73, and 74, respectively. The converters 72, 73, and 74 comprise an electrical system for quantizing each of the red, green, and blue video signals into a plurality of components of discrete amplitude levels, specifically to five different binary amplitude levels, and developing coded trains of five pulses representative of such amplitudes. These converters likewise form no part of the present invention and may be constructed as described in an article by W. M. Goodall, "Telephony by Pulse Code Modulation," Bell System Technical Journal for July 1947, FIG. 4. The output terminals 150, 151, and 152 of the converters 72, 73, and 74, respectively, are individually connected to distributors 75, 76, and 77, each of which includes a sampling circuit for each of the pulse positions corresponding to the five amplitude levels of the signal input, as indicated by the sampling circuits 77a–77e, inclusive, of distributor 77.

The electrical system further comprises a timing signal generator 78 which is connected to synchronize the operation of the flying-spot cathode-ray tube 54 via connection 79, the analog-to-digital converters 72, 73, and 74 via connection 80, the black level setting units 69, 70, and 71 via a connection 80a, the various sampling circuits of the distributors 75, 76, and 77 via a connection 80b, and a power generator 78a for energizing the motor 18 via a connection 80c.

Figure 7:
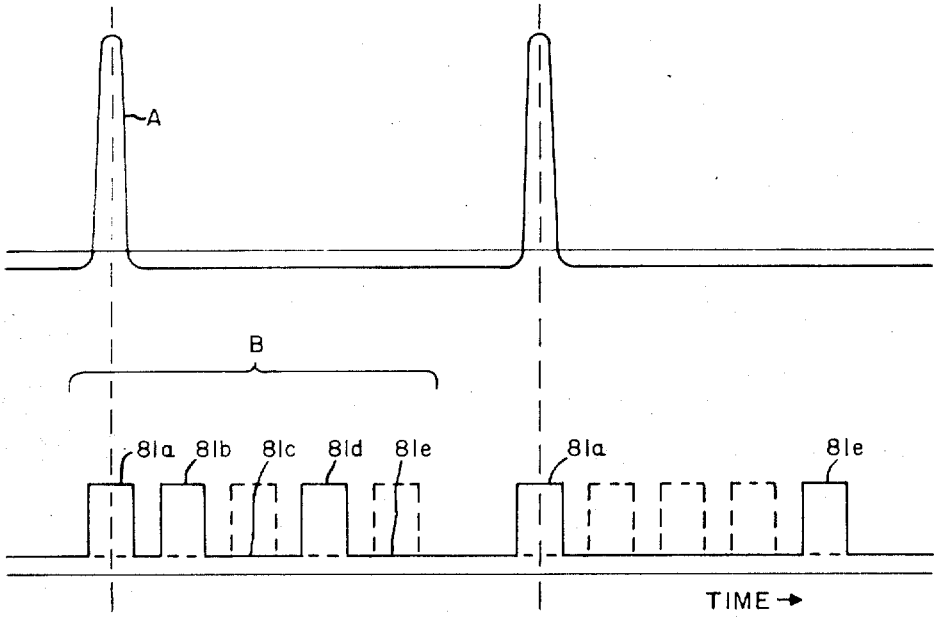
FIGS. 7 and 8 represent the wave forms of the signals developed and applied to certain of the units of FIG. 5.
Figure 8:
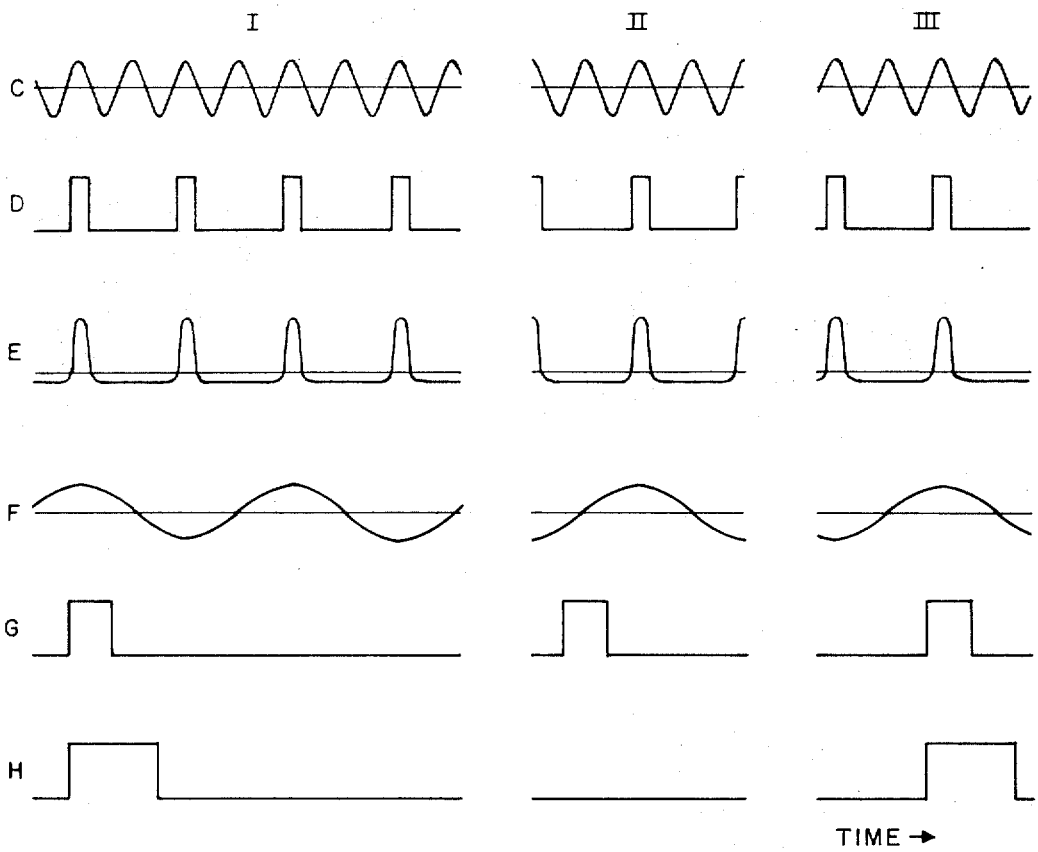

In FIG. 8 are shown the wave forms of the various signals developed by the timing signal generator 78 during three periods, period I being any given initial period, period II following period I by one line-scanning period, and period III following period I by one complete picture-scanning period. Curve C represents the wave form of the sine wave master timing signal from which all other timing signals are derived. Curve D represents a pulse signal of one-half the frequency of Curve C which is applied to the analog-to-digital converters 72, 73, 74 via connection 80. Curve E represents a pulse-wave signal of the same frequency as Curve D which is applied to the sampling circuits of the distributors 75, 76, 77 via connection 80b. It also corresponds to curve A of FIG. 7. Curve F represents a sine-wave signal of one-half the frequency of the signals of Curves D and E and is connected to excite the driving windings 33 of all of the magnetostrictive actuators of the several nozzles. Since a drive of this type responds similarly to half cycles of both polarities, the nozzles are oscillated at the same frequency as the signals of Curves D and E. Curve G represents a line-synchronizing pulse for synchronizing the flying-spot scanner 54 in the line direction via connection 79 and also serves as a control pulse for the black level setting circuits 69, 70, and 71. The signal represented by Curve G is shown in an "interlaced" relation to the signal of wave form D to produce the relationship in which the dots in one reproduced picture line are offset from the dots in adjacent lines. Wave form H represents the synchronizing pulse for controlling the picture frequency scanning of the flying-spot scanner 54. It is shown in noninterlaced relation with respect to the line pulses since each picture is entirely independent of preceding and following pictures so that no gain in performance is obtained by such interlacing.

Figure 6:
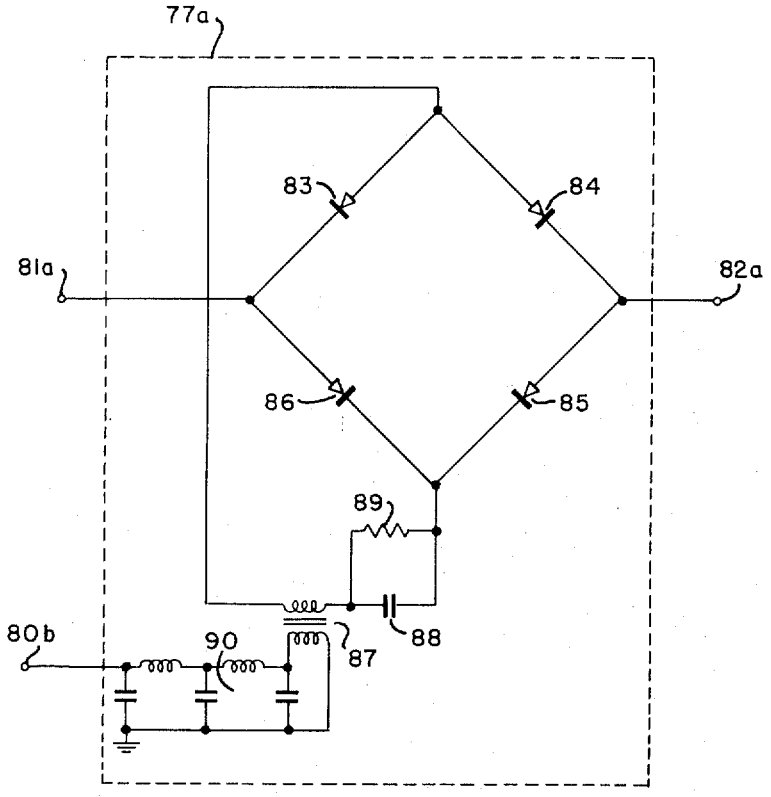

Each of the sampling circuits may be of any type well known in the art but there is shown in FIG. 6 by way of example, one sampling circuit suitable for use in the distributors 75, 76, and 77. Assuming that the circuit of FIG. 6 represents the sampling circuit 77a having an input terminal 81a and an output terminal 82a, this sampling circuit includes a diode switch comprising four diodes 83, 84, 85, and 86 connected in a conventional square. One diagonal of the square is connected between input terminal 81a and output terminal 82a. The conjugate diagonal is connected to the secondary winding of a pulse transformer 87 in series with a capacitor 88 which, in turn, is shunted by a resistor 89. The primary winding of transformer 87 is connected via a delay network 90 to the output connection 80b of the timing signal generator 78.

In the operation of the sampling circuit of FIG. 6, a pulse waveform, represented by waveform A of FIG. 7, is applied from timing generator 78 via connection 80b, the delay network 90 and the transformer 87 to the diode switch. Simultaneously, a quantized and encoded video signal represented by waveform B of FIG. 7 is applied to the diode switch via the input terminal 81a from the analog-to-digital converter 74. Waveform B shows a typical signal which may appear on terminal 152 of FIG. 5 and thus be applied simultaneously to input terminals 81a–81e of sampling circuits 77a–77e. In waveform B, the several pulse positions are identified with numerals representing the intended destination for use of these pulses. Thus the pulse labeled 81a is intended for use by sampling circuit 77a at its terminal 81a; pulse 81b is similarly intended for use by sampling circuit 77b etc. Nevertheless, each of these pulses is applied simultaneously to all five of the sampling circuits. In wave-form B, the dotted lines indicate the fact that each of the pulses may be present or absent, depending on the amplitude of the particular picture elements from which the pulse group has been derived. Waveform A is shown in FIG. 7 with its pulse approximately centered in time upon the pulse 81a of waveform B. If waveform A were to represent the input to sampling circuit 77b via its input terminal 81b, the pulse of waveform A would coincide approximately in time with the center of the pulse 81b of waveform B. The arrangement is such that diode switch 83–86 is rendered conductive by a pulse of Curve A only during the time interval in which a quantized video signal, as represented by pulse 81a of waveform B, may be available at input terminal 81a. During the remaining portion of the cycle of the timing signal generator 78, the diode switch interrupts the connection from the input terminal 81a to the output terminal 82a of the sampling circuit 77.

Each of the several sampling circuits of the distributors 75, 76, and 77 has an individually selected delay circuit, such as the circuit 90, with circuit constants such that, for example, the sampling circuit 77a will sample during the time period allotted to the first pulse of the quantized video signal, the sampling circuit 77b to the time interval allotted to the second pulse of the quantized video signal, etc. Thus each distributor responds to the series of five pulses of the quantized video signal from its respective analog-to-digital converter and places an output voltage pulse, corresponding to the presence or absence of a particular pulse of the quantized video signal, on each of the distributor's five output terminals.

The controlled ink-jet copy-reproducing apparatus of the invention further comprises means responsive to the video signals such as the red, green, and blue signals at the terminals 50, 51, 52 but, more specifically, to the quantized and sampled signals appearing on terminals 83a–83e of distributor 75, the output terminals 84a–84e of the distributor 76, and the output terminals 82a–82e of the distributor 77 for controlling the ink-jet means to control the optical density of the ink deposits on the record sheet.

The optical density of each elemental area of the reproduced copy may be controlled by controlling the quantity of ink discharged from a single controllable jet, or by controlling a plurality of jets having different ink-discharge characteristics, e.g. by the selection of one or more of a plurality of ink-jet nozzles having different rates of ink discharge, or, as described herein, by the selection of one or more of a plurality of ink-jet nozzles discharging inks of different dye concentrations or opacities.

It will be noted that in the construction represented in FIGS. 3 and 4, the ink-jet means of each of the heads 23, 24, and 25 comprises a plurality of controllable ink jets or nozzles which are displaced in the direction of scanning by equal increments and, as stated above, the electric fields developed by the charging cylinders 35a–35e and the deflection plates 37–42 are such that the ink jets are normally directed so as to deposit ink on the record sheet. The ink jets or nozzles of each head, such as the nozzles 26a–26e of head 23, are individually supplied with inks of the same color but of different concentrations or opacities. For example, their opacities may be in the ratio 1:2:4:8:16, making possible thirty-one tonal gradations for each elemental area or spot of the copy reproduction.

As described hereinafter, the fifteen controllable ink jets of the heads 23, 24, and 25 are individually controlled by the quantized signals appearing on the terminals 83a–83e, 84a–84e, and 82a–82e. Because of the incremental displacements of the ink jets in the direction of scanning of the record sheet 12, as described, it becomes necessary to provide means for progressively delaying the quantized signal components delivered by the groups of terminals 83a–83e, 84a–84e, and 82a–82e. To this end, there is provided a delay or storage means 19 (FIG. 1) which may be ı the form of a magnetic storage drum 91, shown in the ɔrm of a planar development of its periphery for convenɜnce. The drum 91 has a plurality of storage tracks 91a qual in number to the total number of quantized videognal components, in this case fifteen. Individually assoiated with the tracks 91a are an equal number of recordıg heads 92 individually connected to the groups of disɜibutor terminals 83a–83e, 84a–84e, and 82a–82e.

The drum 91 is also provided with a corresponding umber of readout heads 93 individually associated with ıe tracks 91a, the readout heads being connected to roups of output terminals 94a–94e, 95a–95e, and 96a–6e. These three groups of terminals are connected to ıe fifteen charging cylinders of the ink-jet heads 23, 24, nd 25, such as to charging cylinders 35a–35e of FIG. 3, ɔr individually controlling the ink jets in response to the elayed quantized signal components. If desired, convenonal amplifiers may be included in the connections deɜribed and appropriate ones of the connections will be ıade with reversed polarity to take into account the oposite polarities of the fields between successvie pairs of eflection plates 37–42, as described above. The design f the system is such that the incremental delays of the ignal components effected by the sampling circuits of ıe distributors 75–76–77 are substantially equal to the ıcremental scanning time differences of their respective ık jets due to their respective displacements about the eriphery of the drum 11.

Coming now to the operation of the controlled ink-jet opy-reproducing apparatus embodying the invention and ɜferring to FIGS. 1 and 2, a record sheet 12, on which a ıulticolor print is to be formed, is mounted on the drum 1. The motor 18 is energized, rotating the drum 11 and ɔncurrently, via the lead screw 21, actuating the carriage 5 carrying the drum 11 axially past the scanning head 2 carrying the ink-jet means. The speed of rotation of ıe motor 18 is controlled via the timing signal generator 8 and power generator 78a (FIG. 5) so that the drum 1 rotates in timed relation with the scanning of the subɜct copy, that is the transparency 53, by the flying-spot ɜanner 54.

Turning now to FIG. 5, the flying-spot scanner and its ssociated circuitry consisting of elements 54–71, inclu.ve, operate in the manner described in aforesaid ſcIlwain and Dean reference to generate red, green, and lue video-signal components representing the image on ıe slide 53. These red, green, and blue video-signal comonents are amplified and their gamma corrected to comensate for departures from unity gamma in the flyingɔot scanner, the signal-translating channels, and the reectances of the inks as deposited on the record sheet 2, etc. The gamma of the signal components may be adısted also to get desired artistic effects. The units 69, 70, nd 71 are effective to stabilize the red, green, and blue ideo-signal components, respectively, on the black level, ıat is, on the level corresponding to an absence in the ıbject copy of any luminance of red, green, or blue hromaticity.

The analog-to-digital converters 72, 73, 74 operate as escribed in the aforesaid Goodall article. The output of ıch of the converters 72, 73, 74 consists of a series of ve pulse positions in each of which a pulse will be present r absent, depending upon the amplitude of the input gnal at the time of sampling. The five pulses (if present) ccur in a regular time sequence and are applied to the istributors 75, 76, and 77, respectively. As stated above, ıch of these distributors includes five sampling circuits hich are keyed or gated by the signal represented by urve E of FIG. 8 from timing signal generator 78 to anslate a signal only at the pulse position corresponding ɔ its respective quantized signal.

As a result, there are potentially developed fifteen uantized video signals, five each representing the red, reen, or blue video-signal component, and these quanzed video signals are individually impressed upon the ɜcord heads 92 of the magnetic storage means on which they are recorded as a series of pulses of amplitudes representative of the sampled video components. In normal operation, the drum 91 rotates in timed relation, specifically in synchronism, with the record sheet 12 on the drum 11. Pulses recorded on the drum by the heads 92 are subsequently read out by the heads 93 and applied to the charging cylinders associated with the ink-jet heads 23, 24, 25 such as the charging cylinders 35a–35e, inclusive. As stated above, in the absence of a video signal on a charging cylinder, the disposition of parts is such that the ink jet from the associated nozzle is directed onto the record sheet 12. When a charging cylinder receives a video-signal component, the ink droplets passing therethrough receive an electric charge so that, in passing through the deflecting field developed by a pair of the deflection plates 37–42, inclusive, they are deflected into one of the drains such as the drains 45a–45e, inclusive. Obviously, the converse of this arrangement might be used.

The peripheral displacement between the record heads 92 and their respective readout heads 93 is progressively increased from track-to-track along the drum 91, the incremental delay between successive associated heads being equal to the incremental time intervals between the scanning of any given spot on a record sheet 12 by the several ink jets of the heads 23, 24, 25. Thus, the circuit means described is effective individually and selectively to excite the electric field charging cylinders 35a–35e, inclusive, in response to the delayed signal components from the drum 91 to direct and deposit ink droplets from their associated ink jets onto the record sheet or away from the record sheet into the drains, such as the drains 45a–45e, inclusive.

Assuming that the amplitudes of the quantized signal outputs of the converters 72, 73, 74 are in the ratio 1:2:4:8:16, the inks supplied to the jets of each of the several heads 23, 24, 25 are given such concentrations that the opacities of the inks discharged from the several jets are in the same ratio. Consequently, on each spot of the record sheet will be deposited a plurality of minute droplets of red, green, and blue inks representative of thirty-one tonal gradations of the red, green, and blue components of each elemental area of the slide 53 being scanned.

The controlled ink-jet copy-reproducing apparatus described above avoids the time-consuming and costly process of fabricating color-separation printing plates required for conventional multicolor printing and also avoids the costly and time consuming developing and printing processes required for multicolor photographic reproduction. Furthermore, the reproduction copies may be formed on ordinary inexpensive paper rather than on expensive multicolor photographic print paper.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A controlled ink-jet apparatus for reproducing a subject copy on a record sheet comprising:

input means for supplying at least one video signal representative of the serial information content of a subject copy to be reproduced and including synchronizing information;

a support for a record sheet;

a head for scanning a record sheet on said support in synchronism with said video signal;

ink-jet means controllable over a range of values disposed on said scanning head for depositing ink on a record sheet on said support and including at least one ink jet for developing a stream of discrete ink droplets;

and means responsive to said video signal for individually controlling said ink droplets to control the ink deposits on the record sheet over a range of values, thereby to produce an effectively continuous-tone reproduction of the subject copy.

2. A controlled ink-jet apparatus for reproducing a subject copy on a record sheet in accordance with claim 1 in which said ink-jet means includes means for selectively and individually electrically charging said ink droplets upon their breakup from the ink jet.

3. A controlled ink-jet apparatus for reproducing a subject copy on a record sheet in accordance with claim 1 in which said in-jet means includes a fluid passage from which emerges a stream of discrete ink droplets and means for selectively and individually electrically charging said ink droplets after emergence from said fluid passage.

4. A controlled ink-jet apparatus for reproducing a subject copy on a record sheet in accordance with claim 1 in which said ink-jet means includes an ink jet from which emerges a continuous ink stream which subsequently breaks up into discrete ink droplets and means for periodically acting upon said ink jet to regulate the breakup of said ink stream into discrete ink droplets.

5. A controlled ink-jet apparatus for reproducing a subject copy on a record sheet comprising:

input means for supplying at least one video signal representative of the serial information content of a subject copy to be reproduced and including synchronizing information;

a support for a record sheet;

a head for scanning a record sheet on said support in synchronism with said video signal;

ink-jet means controllable over a range of values disposed on said scanning head for depositing ink on a record sheet on said support and including at least one ink jet for developing a stream of discrete ink droplets;

and means responding to said video signal for individually controlling said ink droplets to control the optical density of the ink deposits on the record sheet over a range of values, thereby to produce an effectively continuous-tone reproduction of the subject copy.

6. A controlled ink-jet apparatus for reproducing a subject copy on a record sheet comprising:

scanning means for developing at least one video signal representative of the information content of a subject copy to be reproduced;

a support for a record sheet;

a head for scanning a record sheet on said support in synchronism with the scanning of the subject copy;

ink-jet means controllable over a range of values disposed on said scanning head for depositing ink on a record sheet on said support and including at least one ink jet for developing a stream of discrete ink droplets;

and means responsive to said video signal for individually controlling said ink droplets to control the density of the ink deposits on the record sheet over a range of values, thereby to produce an effectively continuous-tone reproduction of the subject copy.

7. A controlled ink-jet apparatus for reproducing a subject copy on a record sheet comprising:

input means for supplying at least one video signal representative of the serial information content of a subject copy to be reproduced and including synchronizing information;

a rotatable support for a record sheet;

a stationary head for scanning a record sheet on said support in synchronism with said video signal;

ink-jet means controllable over a range of values disposed on said scanning head for depositing ink on a record sheet on said support and including at least one ink jet for developing a stream of discrete ink droplets;

and means responsive to said video signal for individually controlling said ink droplets to control the optical density of the ink deposits on the record sheet over a range of values, thereby to produce an effectively continuous-tone reproduction of the subject copy.

8. A controlled ink-jet apparatus for reproducing a multicolor subject copy on a record sheet comprising:

input means for supplying a plurality of video signals, each representative of the serial information content of one color component of a subject copy to be reproduced and including synchronizing information;

a support for a record sheet;

a head for scanning a record sheet on said support in synchronism with said video signal;

a plurality of ink-jet means controllable over a range of values disposed on said scanning head for individually depositing inks of different colors on a record sheet on said support, each of said ink-jet means including at least one ink jet for developing a stream of discrete ink droplets;

and means responsive to said video signals for individually controlling said ink droplets to control the optical density of the ink deposits on the record sheet over a range of values, thereby to produce an effectively continuous-tone reproduction of the subject copy.

9. A controlled ink-jet apparatus for reproducing a subject copy on a record sheet in accordance with claim [5] *8* in which the plurality of ink-jet means are spaced in the direction of scanning of a record sheet and which includes means for imparting delays to certain of said video signals, whereby inks of different colors deposited on any given spot of the record sheet correspond to the same instant of time of the corresponding video signals.

10. A controlled ink-jet apparatus for reproducing a subject copy on a record sheet comprising:

input means for supplying at least one video signal representative of the serial information content of a subject copy to be reproduced and including synchronizing information;

a support for a record sheet;

a head for scanning a record sheet on said support in synchronism with said video signal;

a plurality of controllable ink jets disposed on said scanning head and having different predetermined ink-discharge characteristics;

an electrical system for quantizing said video signal into a plurality of components of discrete amplitude levels;

and circuit means for individually controlling said ink jets in response to said signal components.

11. A controlled ink-jet apparatus for reproducing a subject copy on a record sheet comprising:

input means for supplying at least one video signal representative of the serial information content of a subject copy to be reproduced and including synchronizing information;

a support for a record sheet;

a head for scanning a record sheet on said support in synchronism with said video signal;

a plurality of controllable ink jets disposed on said scanning head to deposit ink on the same spot of said record sheet in response to video information representative of an elemental area of the subject copy and having different predetermined ink-discharge characteristics;

an electrical system for quantizing said video signal into a plurality of components of discrete amplitude levels;

and circuit means for individually controlling said ink jets in response to said signal components.

12. A controlled ink-jet apparatus for reproducing a subject copy on a record sheet comprising:

input means for supplying at least one video signal representative of the serial information content of a subject copy to be reproduced and including synchronizing information;
a support for a record sheet;
a head for scanning a record sheet on said support in synchronism with said video signal;
a plurality of ink jets disposed on said scanning head normally directed so as to deposit ink on said record sheet and having different predetermined ink-discharge characteristics;
a plurality of means for developing electric fields, individual to and encompassing the trajectories of said ink jets;
an electrical system for quantizing said video signal into a plurality of components of discrete amplitude levels;
and circuit means for individually and selectively exciting said electric field means in response to said signal components to deposit ink from their associated jets onto the record sheet.

13. A controlled ink-jet apparatus for reproducing a ubject copy on a record sheet comprising:
input means for supplying at least one video signal representative of the serial information content of a subject copy to be reproduced and including synchronizing information;
a support for a record sheet;
a head for scanning a record sheet on said support in synchronism with said video signal;
a plurality of controllable ink jets disposed on said scanning head displaced in the direction of scanning and having different predetermined ink-discharge characteristics;
an electrical system for quantizing said video signal into a plurality of components of discrete amplitude levels;
means for progressively delaying said quantized signal components;
and circuit means for individually controlling said ink jets in response to said delayed signal components;
said delays of said signal components substantially equalling the scanning time differences of their respective ink jets.

14. A controlled ink-jet apparatus for reproducing a ubject copy on a record sheet comprising:
input means for supplying at least one video signal representative of the serial information content of a subject copy to be reproduced and including synchronizing information;
a support for a record sheet;
a head for scanning a record sheet on said support in synchronism with said video signal;
a plurality of controllable ink jets disposed on said scanning head displaced by equal increments in the direction of scanning and having different predetermined ink-discharge characteristics;
an electrical system for quantizing said video signal into a plurality of components of discrete amplitude levels;
means for progressively delaying said quantized signal components;
and circuit means for individually controlling said ink jets in response to said delayed signal components,
said incremental delays of said signal components substantially equalling the incremental scanning time differences of their respective ink jets.

15. A controlled ink-jet apparatus for reproducing a ubject copy on a record sheet comprising:
input means for supplying at least one video signal representative of the serial information content of a subject copy to be reproduced and including synchronizing information;
a support for a record sheet;
a head for scanning a record sheet on said support in synchronism with said video signal;
a plurality of ink jets disposed on said scanning head and having different predetermined ink-discharge characteristics;
means for oscillating said ink jets to break up the ink discharged therefrom into discrete droplets;
a plurality of means for developing electric fields individual to and encompassing the trajectories of said droplets;
an electrical system for quantizing said video signal into a plurality of components of discrete amplitude levels;
and circuit means for individually and selectively exciting said electric field means in response to said signal components to direct said ink droplets to or away from the record sheet.

16. A controlled ink-jet apparatus for reproducing a multicolor subject copy on a record sheet comprising:
scanning means for developing a plurality of video signals each representative of the information content of one color component of a subject copy to be reproduced;
a support for a record sheet;
a plurality of heads, one for each color component, for scanning a record sheet on said support in synchronism with the scanning of the subject copy;
a plurality of controllable ink jets disposed on each of said scanning heads and having different predetermined ink-discharge characteristics;
an electrical system for quantizing each of said video signals into a plurality of components of discrete amplitude levels;
and circuit means for individually controlling said ink jets on each of said heads in response to the corresponding quantized signal components of one of said video signals.

*17. A controlled ink-jet apparatus for reproducing a subject copy on a record sheet comprising:*
*storage means for storing in digital form and later supplying at least one video signal representative of the serial information content of a subject copy to be reproduced;*
*a support for a record sheet;*
*a head for scanning a record sheet on said support;*
*ink-jet means disposed on said scanning head including at least one ink jet for developing a stream of discrete ink droplets directed toward the record sheet;*
*an output connection from said storage means to said ink-jet means;*
*said ink-jet means including a charging electrode receiving the signal from said storage means for selectively charging each droplet;*
*and a drive controlling the scanning of said head and the stimulation of said ink jet in synchronism with the unloading of information from said storage means.*

*18. A controlled ink-jet apparatus as defined in claim 17, wherein said drive includes a master timing signal generator.*

*19. A controlled ink-jet apparatus as defined in claim 17, including scanning means for scanning the subject copy, converter means receiving an analog signal from said scanning means and producing a video signal representing the copy as digital information, and circuit means connecting the output of said scanning means to said storage means.*

*20. A controlled ink-jet apparatus for reproducing a subject copy on a record sheet comprising:*
*storage means for storing digital information representative of the serial information content of a subject copy to be reproduced;*
*a support for a record sheet;*
*a head for scanning a record sheet on said support;*
*ink-jet means disposed on said scanning head including at least one nozzle and means for breaking a stream of ink from said nozzle into discrete droplets directed toward the record sheet;*

*a charging electrode adjacent said nozzle at the point of drop separation for selectively charging each droplet;*

*an output connection from said storage means to said charging electrode for supplying the serial information to said charging electrode,*

*and a drive connected to provide synchronized scanning of said head, stimulation of said ink stream from said nozzle, and serial unloading of information from said storage means.*

*21. The method of reproducing a subject copy on a record sheet from a video signal representing the serial information content of the copy, comprising the steps of*

*(a) storing the video signal in a memory device,*

*(b) producing scanning movement between at least one ink-jet device from which discrete droplets are projected and a record sheet toward which the droplets are directed,*

*(c) charging selected ones of the droplets to the same*

*charge level and removing droplets of one charge status to prevent their deposit on the record sheet,*

*(d) unloading the memory device and also stimulating the ink-jet device in synchronism with the scanning movement, and*

*(e) employing the information unloaded from the memory device to control the selective charging of the droplets.*

References Cited

The following references, cited by the Examiner, are of record in the patented file of this patent or the original patent.

UNITED STATES PATENTS

| | | | |
|---|---|---|---|
| 3,298,030 | 1/1967 | Lewis et al. | 346—75 |
| 3,369,252 | 2/1968 | Adams | 346—75 |
| 1,817,098 | 8/1931 | Ranger et al. | 178—5.2 |
| 2,951,894 | 9/1960 | Hirsch. | |

RICHARD MURRAY, Primary Examiner